(12) United States Patent
Foti

(10) Patent No.: US 6,839,323 B1
(45) Date of Patent: Jan. 4, 2005

(54) METHOD OF MONITORING CALLS IN AN INTERNET PROTOCOL (IP)-BASED NETWORK

(75) Inventor: George Foti, Dollard des Ormeaux (CA)

(73) Assignee: Telefonaktiebolaget LM Ericsson (PUBL), Stockholm (SE)

( * ) Notice: Subject to any disclaimer, the term of this patent is extended or adjusted under 35 U.S.C. 154(b) by 0 days.

(21) Appl. No.: 09/570,997

(22) Filed: May 15, 2000

(51) Int. Cl.[7] .............................................. G01R 31/08
(52) U.S. Cl. ...................... 370/235; 370/356; 370/389; 370/392; 370/401; 379/7
(58) Field of Search ......................... 370/235, 352–356, 370/389, 392, 401, 400, 420, 466, 468; 379/7

(56) References Cited

U.S. PATENT DOCUMENTS

| | | | | |
|---|---|---|---|---|
| 6,078,648 A | * | 6/2000 | Albers et al. | 379/35 |
| 6,097,798 A | * | 8/2000 | Albers et al. | 379/114.28 |
| 6,445,695 B1 | * | 9/2002 | Christie, IV | 370/352 |
| 6,560,224 B1 | * | 5/2003 | Kung et al. | 370/356 |
| 6,563,797 B1 | * | 5/2003 | Kung et al. | 370/252 |

* cited by examiner

Primary Examiner—Frank Duong
Assistant Examiner—Melanie Jagannathan
(74) Attorney, Agent, or Firm—Smith & Danamraj, P.C.

(57) ABSTRACT

A method of monitoring a call with a mobile terminal (MT) in an Internet Protocol (IP)-based network having a Gatekeeper that controls the network, a plurality of access routers that provide access to the network, and a Monitoring Station having monitoring facilities and a database of MTs to be monitored. When the MT sends an Admission Request message to the Gatekeeper, the Gatekeeper sends a query to the Monitoring Station asking whether the MT is to be monitored. The Monitoring Station sends a reply to the Gatekeeper indicating that the MT is to be monitored and providing an IP address where monitored packets are to be sent. The Gatekeeper then sends a monitoring request message to the access router associated with the MT. The request identifies the MT to be monitored, instructs the access router to monitor the MT, and provides a unique call identification (Call ID) and the IP address where monitored packets are to be sent. When the access router detects a packet associated with the MT, the router sends all packets associated with the MT to the Monitoring Station. The method also controls monitoring during intra-domain and inter-domain handoffs of the MT.

24 Claims, 6 Drawing Sheets

METHOD OF MONITORING CALLS IN AN INTERNET PROTOCOL (IP)-BASED NETWORK

BACKGROUND OF THE INVENTION

1. Technical Field of the Invention

This invention relates to telecommunication systems and, more particularly, to a method of monitoring calls in an Internet Protocol (IP)-based network.

2. Description of Related Art

In existing circuit-switched telecommunications networks such as the Public Switched Telephone Network (PSTN) and the legacy Public Land Mobile Network (PLMN), law enforcement agencies are able to easily monitor telephone calls because the calls, once established, are routed over a dedicated path from one subscriber to another. In an IP-based telecommunications network, this is not the case.

For IP calls that originate in a circuit-switched network, a gateway provides an interface between the circuit-switched network and the packet-switched IP network. The gateway takes bits of digitized voice, packetizes them, puts on a header, and ships them over the EP network. The packetized call may enter the core IP network at any access (edge) router near the originating subscriber. Thereafter, the individual packets follow any available route to the destination address. At that point, all of the packets exit the core network through a single access router near the destination subscriber. The same principle applies if both the calling terminal and the called terminal are IP-based. Since one or both of the subscribers involved in the call may be mobile, calls between the same subscribers may enter and leave the IP network through different access routers at different times. As a result of the changing access routers and the independent routing of the packets in the IP network, law enforcement L, agencies are not able to monitor real-time IP applications such as Voiceover-IP (VoIP) calls.

It would be advantageous to have a method of monitoring calls in an Internet Protocol (IP)-based network. The present invention provides such a method.

SUMMARY OF THEE INVENTION

In one aspect, the present invention is a method of monitoring a call from a mobile terminal (MT) in an IP-based network having a Gatekeeper that controls the network, a plurality of access routers that provide access to the network, and a Monitoring Station having monitoring facilities and a database of MTs to be monitored. The method includes the steps of sending an access request from the MT to the Gatekeeper, sending a query from the Gatekeeper to the Monitoring Station asking whether the MT is to be monitored, and sending a reply from the Monitoring Station to the Gatekeeper indicating that the MT is to be monitored and providing an IP address where monitored packets are to be sent. This is followed by sending a monitoring request from the Gatekeeper to the access router associated with the monitored MT, the request identifying the MT to be monitored, instructing the access router to monitor the MT, and providing the IP address where monitored packets are to be sent. When the access router detects a packet associated with the MT, the router sends all packets associated with the MT to the Monitoring Station.

When the monitored MT is handed off from a first base station to a second base station, and each of the base stations is controlled by a single Radio Network Controller (RNC), the RNC sends a monitoring request to the second base station. The monitoring request identifies the MT to be monitored, instructs the second base station to monitor the MT, and provides a unique call identification (Call ID) and the IP address where monitored packets are to be sent. The unique Call ID is assigned by the Gatekeeper. The RNC also sends a notification to the Gatekeeper that the MT is being served by the second base station, and includes the unique Call ID and a new transport address for the MT, if any.

When the monitored MT is handed off from a first base station controlled by a first RNC to a second base station controlled by a second RNC, and both RNCs are in a single Gatekeeper domain, the method performs the steps of sending identifying information regarding the MT being monitored from the first RNC to the second RNC, and sending a monitoring request from the second RNC to the second base station, the request identifying the MT to be monitored, instructing the second base station to monitor the MT, and providing the unique Call ID and the IP address where monitored packets are to be sent. The second RNC also sends a notification to the Gatekeeper that the MT is being served by the second base station, and includes the Call ID and the new transport address for the MT. Whenever there is a change to the transport address of the MT, the Gatekeeper forwards the Call ID and the new transport address to the Monitoring Station.

When the monitored MT is handed off from a first base station controlled by a first RNC in a first Gatekeeper domain, to a second base station controlled by a second RNC in a second Gatekeeper domain, the method performs the steps of sending a notification from the first RNC to the second RNC that the MT is being monitored, and sending a monitoring request from the second RNC to the second base station. The monitoring request identifies the MT to be monitored, instructs the base station to monitor the MT, and provides the unique Call ID and the IP address of a Monitoring Station where monitored packets are to be sent. The second base station then begins sending media packets having the MT address as a source address or destination address to the Monitoring Station. Then, the second RNC sends the unique Call ID it received and a new transport address for the MT to the second Gatekeeper. The second Gatekeeper forwards this information to the Monitoring Station. This is followed by sending an access request from the MT to the second Gatekeeper, and allocating bandwidth to the MT by the Gatekeeper.

In another aspect, the present invention is a method performed within a Gatekeeper in an IP-based network. The method monitors a call from an MT and routes the monitored call to a Monitoring Station having monitoring facilities and a database of MTs to be monitored. The method includes the steps of receiving in the Gatekeeper, a network access request from the MT, sending a query from the Gatekeeper to the Monitoring Station asking whether the MT is to be monitored, and receiving in the Gatekeeper, a reply from the Monitoring Station indicating that the MT is to be monitored and providing an IP address where monitored packets are to be sent. This is followed by sending a monitoring request from the Gatekeeper to the access router that is associated with the monitored MT and is providing access to the network. The request identifies the MT to be monitored, instructs the access router to send any packets associated with the MT to the Monitoring Station, and provides the unique Call ID and the IP address where monitored packets are to be sent.

BRIEF DESCRIPTION OF THE DRAWINGS

The invention will be better understood and its numerous objects and advantages will become more apparent to those skilled in the art by reference to the following drawings, in conjunction with the accompanying specification, in which.

DETAILED DESCRIPTION OF EMBODIMENTS

The present invention is described herein primarily in terms of the International Telecommunications Union (ITU) H.323 protocol, but is equally applicable to both H.323 and the Session Initiation Protocol (SIP) developed by the Internet Engineering Task Force (IETF). In particular, the term "Gatekeeper" which is used herein refers to both an H.323 Gatekeeper and a SIP proxy server and registry. In addition, reference to an H.245 address herein also refers to a SIP address.

In a typical IP network, PC clients or IP telephony terminals (fixed or mobile) are identified and addressed by an e-mail address (proxy/alias), or an IP address, or both. Prior to making any calls, such terminals register with a Gatekeeper in an H.323 network, or with a SIP proxy server in a SIP network. If the registration is accepted by the Gatekeeper, the Gatekeeper handles incoming calls to the terminal as well as outgoing calls from the terminal. The Gatekeeper maintains a subscriber profile that includes, among other things, the services to which the subscriber is entitled. For simplicity, the term "mobile terminal (NM)" is used herein to refer generically to IP clients, both fixed and mobile since the most challenging monitoring tasks involve intra-domain and inter-domain handoff of MTs.

Figure 1:
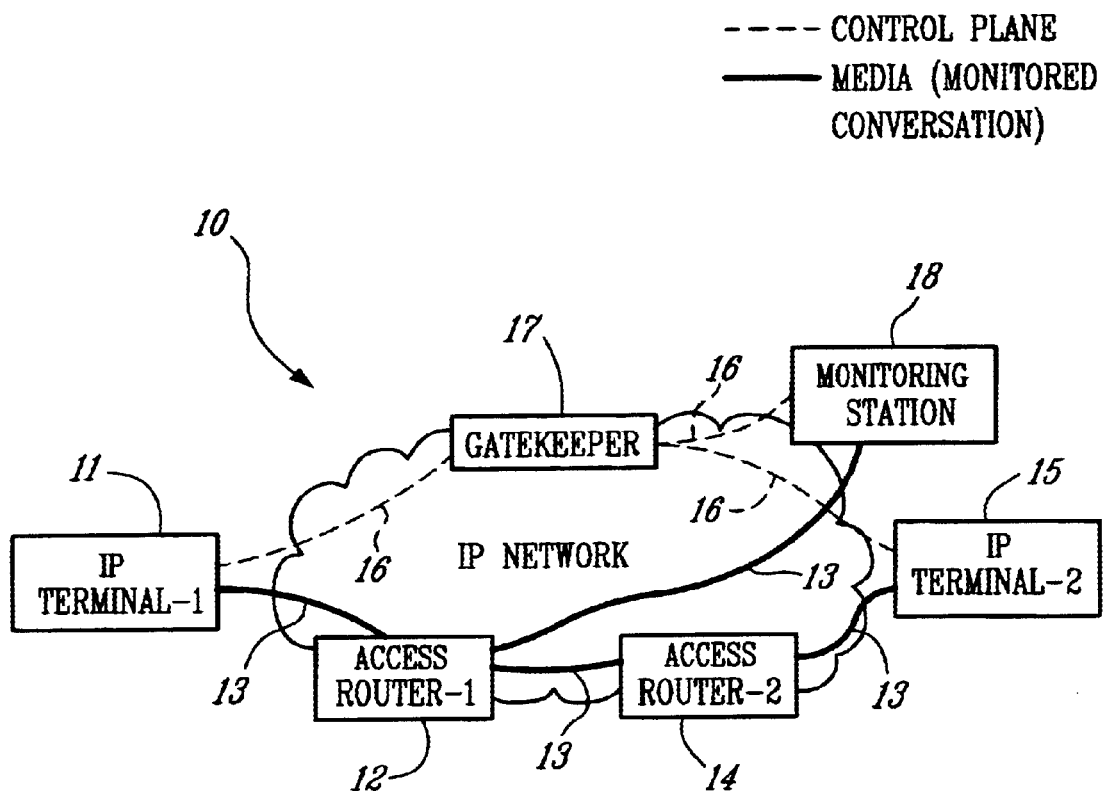
FIG. 1 is an illustrative drawing of an IP network modified in accordance with the teachings of the present invention to monitor a call between two IP terminals.

FIG. 1 is an illustrative drawing of an IP network 10 modified in accordance with the teachings of the present invention to monitor a call between two IP terminals. IP Terminal-1 11, which may be originating a call, is connected to the IP network through Access Router-1 12. Media traffic (i.e., data) 13 is carried by independent paths through the network In to Access Router-2 14 through which IP Terminal-2 15 has accessed the network. IP Terminal-2 may be the terminating (destination) terminal. Control signaling between the two subscribers is carried in a control plane 16 which passes through a Gatekeeper 17, and from the Gatekeeper to a Monitoring Station 18 which may be operated by a law enforcement agency.

In order for the two IP subscribers 11 and 15 to communicate over the IP-based network 10, they have to go through the Gatekeeper 17 which can be likened to a mobile switching center (MSC) in a circuit-switch switched network. The Gatekeeper is the brain of the network regarding the routing of calls. The Gatekeeper manages the bandwidth (with the help of other network entities), generates the accounting data, etc.

In a first scenario, the calling and called subscribers are within the same domain. In that case, when a subscriber wants to make or receive a call, an Admission Request (ARQ) message (when using H.323) is sent to the Gatekeeper. In response to the ARQ message, the Gatekeeper allocates the bandwidth for the call or, if none is available, the Gatekeeper denies the call. The present invention extends the procedure performed by the Gatekeeper when a bandwidth allocation request (i.e., ARQ) is received from a device that is originating or receiving a call. Additionally, new mandatory parameters are introduced in the ARQ message.

The Gatekeeper does not know which subscribers need to be monitored. Only the law enforcement Monitoring Station has this information. The Monitoring Station includes a database of all subscribers who should be monitored for security reasons. So for each call that is originated by or terminated to a subscriber in its domain, the Gatekeeper queries the Monitoring Station to determine whether the subscriber should be monitored.

Figure 2:
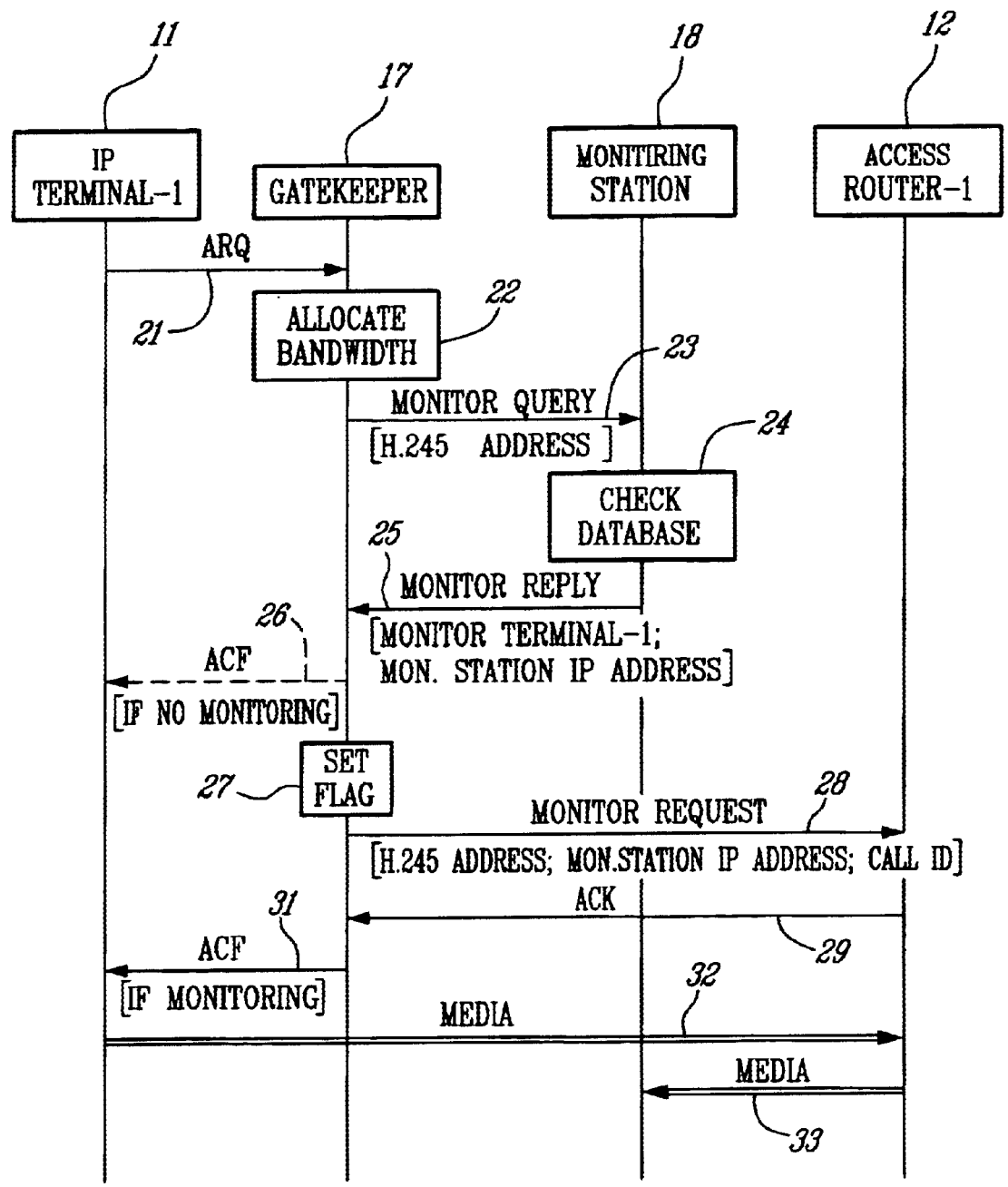
FIG. 2 is a message flow diagram illustrating the flow of messages when setting up a call for monitoring in the IP network of FIG. 1 in accordance with the teachings of the present invention.

FIG. 2 is a message flow diagram illustrating the flow of messages when setting up a call for monitoring in the IP network of FIG. 1 in accordance with the teachings of the present invention. In the illustrated example, IP Terminal-1 11 is the subscriber to be monitored. After Terminal-1 sends an ARQ message 21 to the Gatekeeper 17, the Gatekeeper performs the bandwidth allocation function at 22, and then sends a monitor query message 23 to the Monitoring Station 18. The monitor query message includes the H.245 source address and the H.245 destination address for the call, if available, as well as subscriber addressing information (e-mail/proxy) and the unique Call ID that it generates for the call. The Monitoring Station checks the database at 24 and returns a monitor reply message 25 to the Gatekeeper indicating whether any of the parties in the call should be monitored, as well as the IP address of the Monitoring Station to which the monitored conversation should be sent. In the illustrated example, the message indicates that Terminal-1 is to be monitored. If none of the terminals is being monitored, the Gatekeeper then returns an Admission Confirm (ACF) message 26 to Terminal-1. If any of the subscribers is being monitored, the Gatekeeper sets a flag in the subscriber record at 27 indicating that fact.

The Gatekeeper finds, through normal IP routing protocols, the path for the media to follow. The Gatekeeper obtains this information in the course of allocating bandwidth since the policy related to the QoS of the call must be downloaded to all of the routers in the media path. The routers, in this case, act as policy enforcement points to ensure that the subscribers are respecting the QoS agreements. However, for the sake of monitoring, it suffices that the Gatekeeper identifies only the access router associated with IP Terminal-1.

Hence, the Gatekeeper is able to identify the access router for this call. The Gatekeeper then sends a Monitoring Request message 28 to the access router associated with the subscriber (for example, Access Router-1), and includes the Monitoring Station IP address and the unique Call ID for that call. Access Router-1 sends back an Acknowledgment message 29. Once the Gatekeeper receives the Acknowledgment message from the Access Router, the Gatekeeper sends an ACF message 31 to Terminal-1.

It should also be noted that in IP networks, addressing is different in each media direction. Therefore, the EP address to be monitored is the source address in the IP header while the monitored subscriber is initiating the conversation, and is the destination field in the IP header while the monitored subscriber is listening. Thus, while the Access Router performs its normal routing functions, it has to monitor both the source and the destination addresses in the IP headers that it handles in order to identify addresses that match the monitored address. Media packets then begin to flow from the IP Terminal to Access Router-1 at 32, and Access Router-1 sends the packets to the Monitoring Station at 33.

To send media packets to the Monitoring Station, the Access Router encapsulates every identified packet with a new header that includes the router's address as the source address, and the Monitoring Station's address as the destination address. The unique Call ID is also included in the IP header. This enables the Monitoring Station to correlate packets belonging to the same conversation. Other parameters may be included in the header as well. Upon receipt, the Monitoring Station strips away the header and recovers the original packets. When the call is cleared, the connection from the access router to the Monitoring Station is also cleared.

In another scenario, the calling and called subscribers are in different domains. In that case, two different Gatekeepers must deal with the calling and called subscribers. Additional information must be exchanged between the Gatekeepers as part of the call setup for the management and coordination of monitoring a call. Otherwise, both Gatekeepers may end up monitoring the same call.

In this scenario, the originating Gatekeeper will likely not know the IP address of the destination. Thus, the originating Gatekeeper follows the same procedure previously described. However, the query that the originating Gatekeeper sends to the Monitoring Station includes only the calling subscriber identity. If the calling subscriber is not the one being monitored, then the originating Gatekeeper returns an ACF message and proceeds with normal call setup. During the setup, the originating Gatekeeper forwards to the Gatekeeper that deals with the destination terminal, a special flag informing the destination Gatekeeper that the calling subscriber is not the one being monitored. The destination Gatekeeper follows the previously described procedure, including the monitoring procedure, when the called terminal sends an ARQ message to accept the incoming call.

On the other hand, if the calling subscriber is the one being monitored, the originating Gatekeeper follows the same procedure described previously when it receives an ARQ message from the calling subscriber. The originating Gatekeeper then sends a flag to the destination Gatekeeper identifying the calling subscriber as a subscriber to be monitored. The destination Gatekeeper follows the same procedure previously described when the called terminal sends an ARQ message to accept the call, but bypasses the monitoring procedure.

It should also be noted that in this scenario, the originating Gatekeeper receives only the destination IP address as part of the call setup procedure. Therefore, the originating Gatekeeper must send a second Monitoring Request Message to the Access Router to convey the destination IP address.

Figure 3:
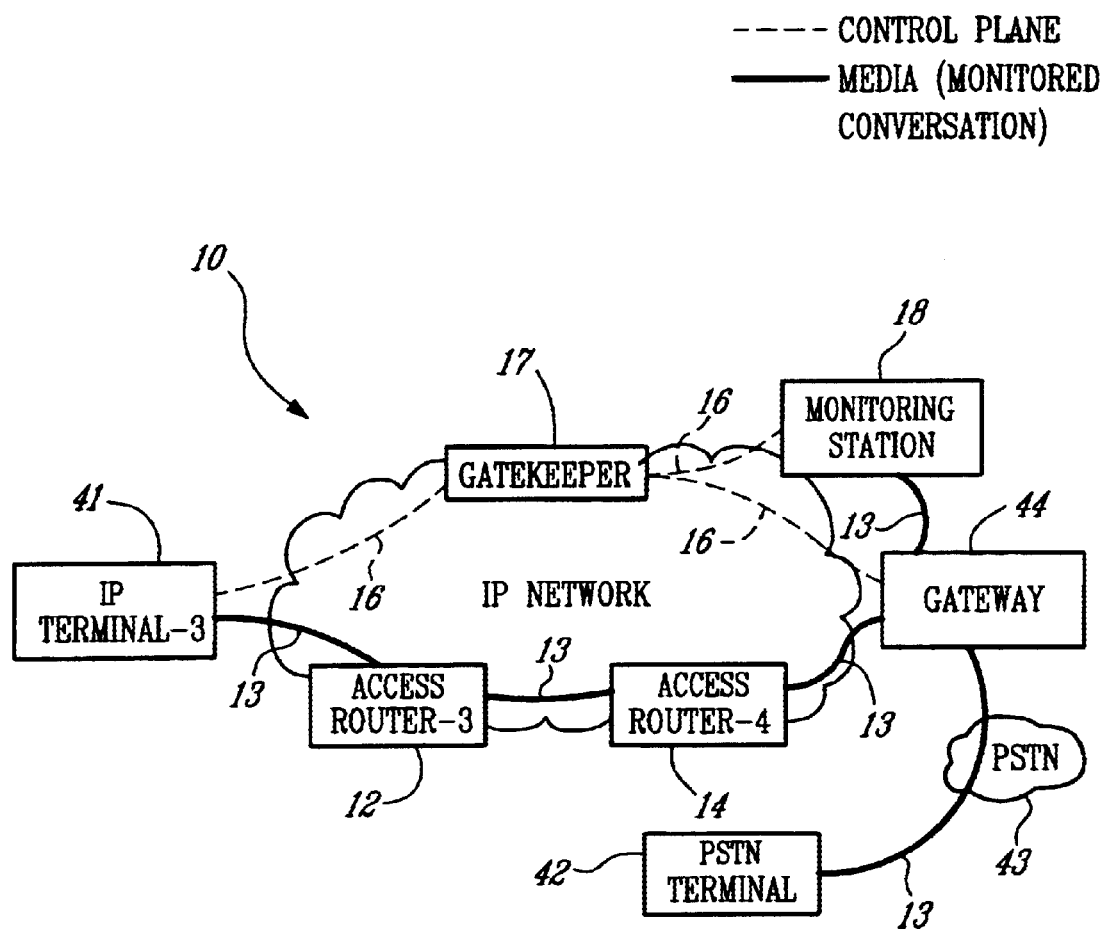
FIG. 3 is an illustrative drawing of an IP network modified in accordance with the teachings of the present invention to monitor a call between an IP terminal and a terminal in the Public Switched Telephone Network (PSTN)

FIG. 3 is an illustrative drawing of an IP network 20 modified in accordance with the teachings of the present invention to monitor a call between an IP terminal (IP Terminal-3) 41 and a terminal in a circuit-switched network (PSTN Terminal) 42 such as the Public Switched Telephone Network (PSTN) 43. If the subscriber to be monitored is in a circuit-switched network such as the PSTN, the call goes through a Gateway 44 to the IP subscriber in the IP network. If the subscriber to be monitored is on the PSTN side, then existing procedures in the PSTN ensure that monitoring takes place. However, if the subscriber to be monitored is on the IP side, the procedure described previously is invoked when the called subscriber (to be monitored) sends an ARQ message to the Gatekeeper to accept an incoming call.

Again in this case, coordination is needed to ensure that no double monitoring occurs when both subscribers are to be monitored. Therefore, for an H.323 endpoint of the gateway type (as opposed to a terminal type of endpoint), the ARQ message sent to the Gatekeeper from the Gateway 44 includes a flag to indicate whether an incoming call is already being monitored from the PSTN side. The Gatekeeper then bypasses the monitoring procedure. The PSTN, of course, must convey this information to the Gateway so that it can be passed to the Gatekeeper. In one embodiment, Integrated Services User Part (ISUP) signaling is extended to carry this information. Optionally, specialized control messages can convey the information to the Gateway from the entity that is coordinating the monitoring in the PSTN. In all cases, the globally unique Call ID must be transferred to uniquely identify the impacted call.

Mobility/Handoff Scenarios

Mobility adds another level of complexity to the task of IP monitoring due to the potential changing of the point of attachment of the MT to the network. In this case, the base stations serve as Access Routers since they are the closest point of attachment to the subscriber. However, Gatekeepers do not communicate directly with base stations since base stations belong to the Radio Access Network (RAN). Therefore, the Gatekeepers must go through the Radio Network Controller/Base Station Controller (RNC/BSC) that controls these base stations for all requests to the base stations regarding the monitoring of subscribers.

Therefore, the same procedures described above for monitoring fixed subscribers still apply for mobile subscribers except that all Gatekeeper requests that are sent directly to the Access Routers for fixed subscribers, are sent instead to the RNC. The RNC, in turn, sends them to the base stations.

Figure 4:
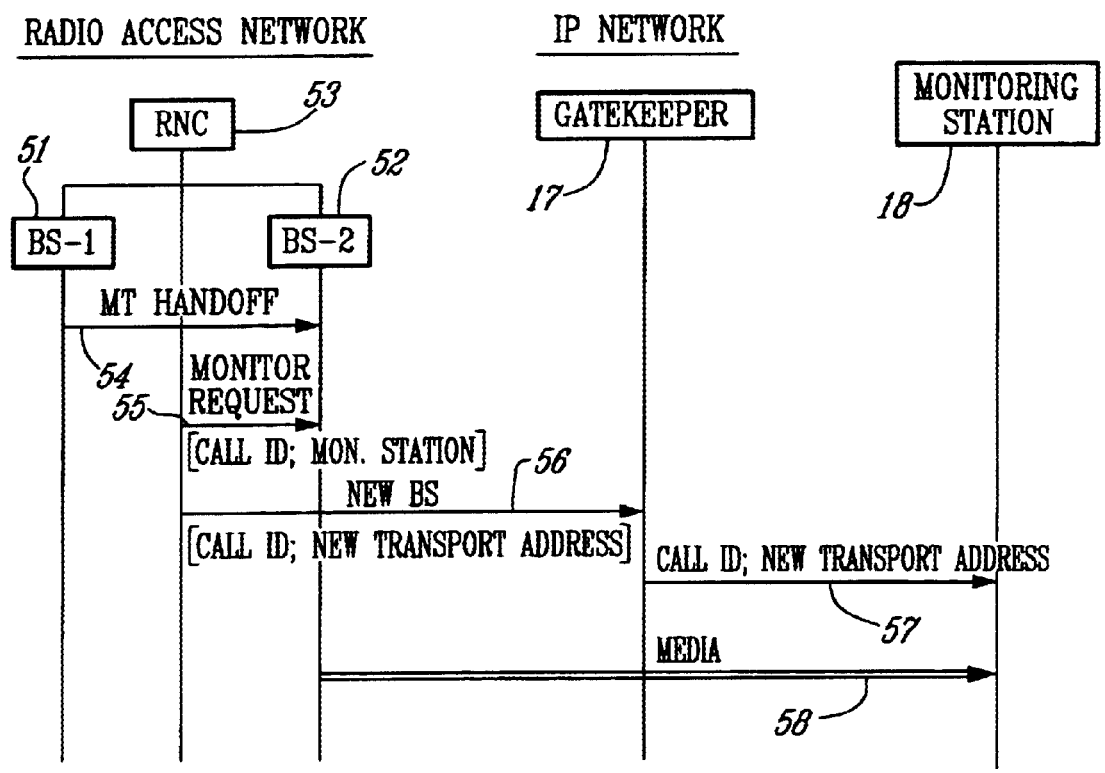
FIG. 4 is a message flow diagram illustrating the flow of messages when a monitored mobile terminal is handed off from an old base station to a new base station controlled by the same Radio Network Controller (RNC) as the old base station.

FIG. 4 is a message flow diagram illustrating the flow of messages when the monitored mobile terminal (MT) is handed off from an old base station (BS-1) 51 to a new base station (BS-2) 52 controlled by the same RNC 53 as the old base station. When the MT does not change its transport address, but roams in a new base station, the link layer in the base station ensures delivery of the call to the MT. After handoff occurs at 54, the RNC instructs BS-2 to monitor the subscriber at 55 and includes the address of the Monitoring Station and the unique Call ID. The RNC then informs the Gatekeeper 17 of the new base station at 56, and includes the unique Call ID to identify the impacted call. If there is a change in the transport address of the mobile terminal as a result of the handoff, the new address is also sent to the Gatekeeper by the RNC. The RNC learns the new address during the handoff procedure. In the preferred embodiment, this information is passed only for monitored subscribers in order to minimize the signaling load. At 57, the Gatekeeper forwards the Call ID bu §and the new transport address, if any, to the Monitoring Station 18. At 58, media is passed from BS-2 to the Monitoring Station.

Figure 5:
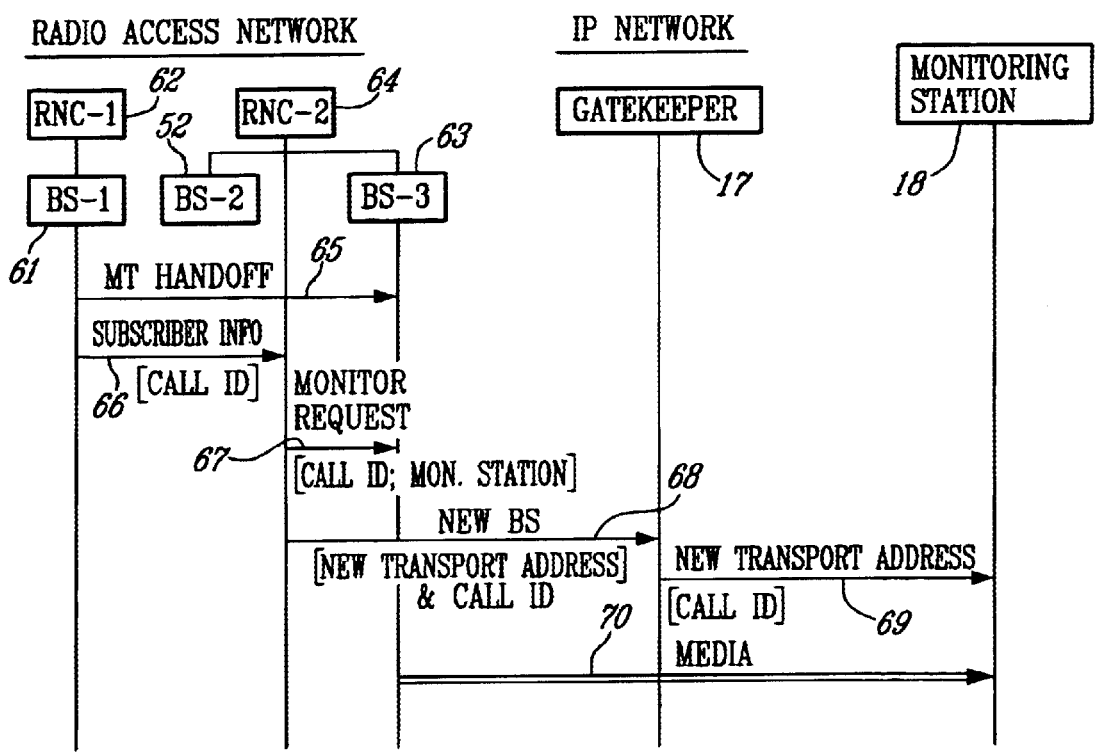
FIG. 5 is a message flow diagram illustrating the flow of messages when a monitored mobile terminal roams into a new subnet within the same domain, and acquires a new RNC, a new base station, and a new transport address.

FIG. 5 is a message flow diagram illustrating the flow of messages when the monitored MT is handed off from an old base station (BS-1) 61 a, controlled by an old RNC (RNC-1) 62 to a new base station (BS-3) 63 controlled by a new RNC (RNC-2) 64 within the same Gatekeeper domain. Thus, in this scenario, the MT roams into a new subnet within the same domain, and acquires a new RNC, a new base station, and a new transport address. At 65, the MT is handed off from BS-1 to BS-3. At 66, RNC-1 forwards to RNC-2 all of the pertinent information regarding the subscriber being monitored, including the unique Call ID for the call being monitored. At 67, the new RNC (RNC-2) instructs the new base station (BS-3) to monitor the subscriber, and includes the unique Call ID and the address of the Monitoring Station.

Since the mobile terminal changed transport addresses, it is required to register its new transport address with the Gatekeeper 17. Therefore, at 68, RNC-2 informs the Gatekeeper of the new base station and the new transport address assigned to the mobile terminal. The unique Call ID is also included. At 69, the new transport address and the Call ID are passed by the Gatekeeper to the Monitoring Station 18 so that all the packets belonging to the same monitored call can be correlated. Thereafter, media packets are forwarded from BS-3 to the Monitoring Station at 70.

Figure 6:
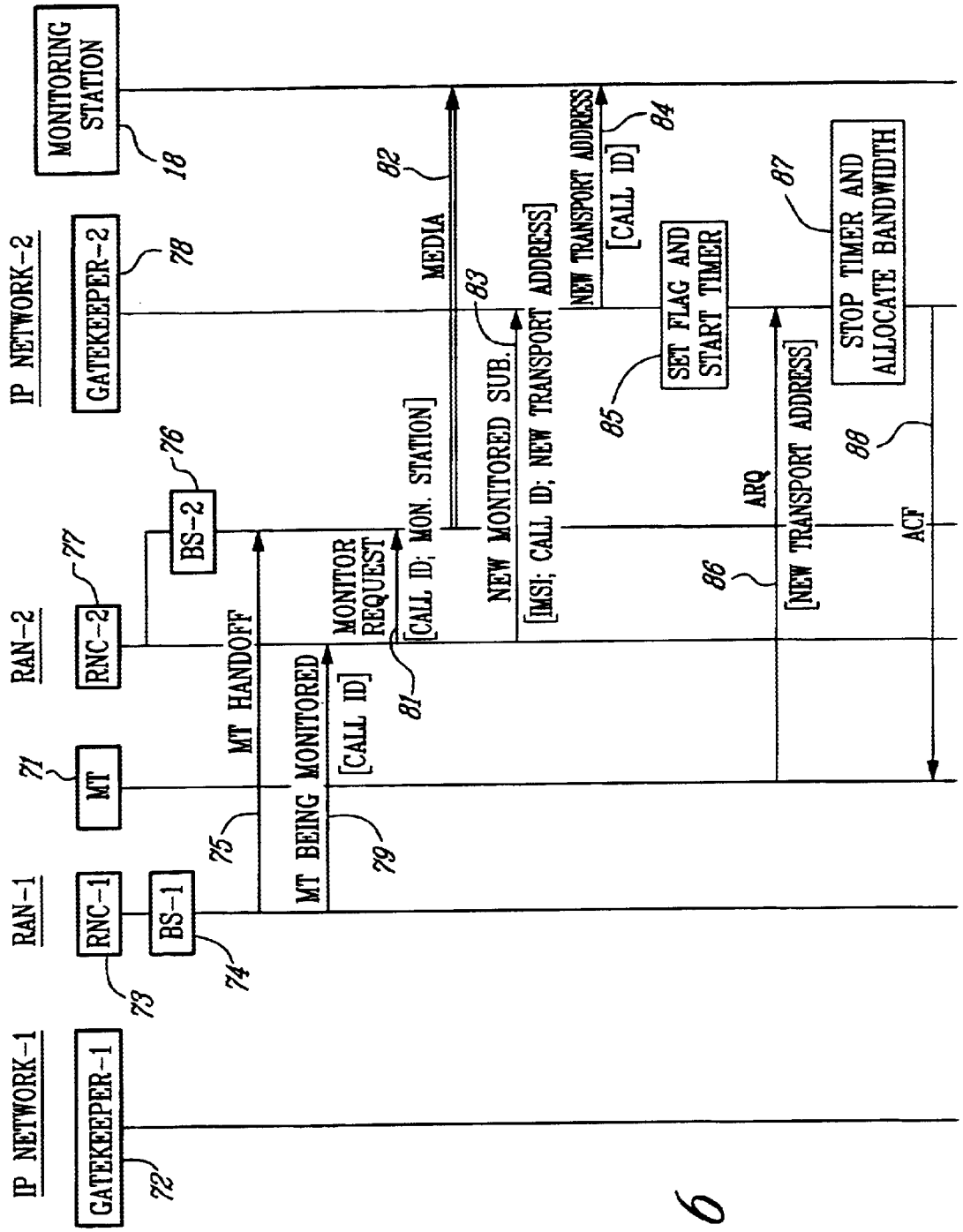
FIG. 6 is a message flow diagram illustrating the flow of messages when the mobile terminal roams into a new domain and acquires a new Gatekeeper, a new RNC, a new base station, and a new transport address.

FIG. 6 is a message flow diagram illustrating the flow of messages when the mobile terminal roams into a new domain and acquires a new Gatekeeper, a new RNC, a new base station, and a new transport address. The monitored MT 71 is initially operating in IP Network-1 which includes Gatekeeper-1 72. RNC-1 73 and BS-1 74 are in RAN-1 which provides radio access for IP Network-1. At handoff 75, the monitored MT is handed off from BS-1 to a new base station (BS-2) 76 controlled by a new RNC (RNC-2) 77. RNC-2 and BS-2 are in RAN-2 which provides radio access for IP Network-2 which includes Gatekeeper-2 18. Monitoring Station 18 is monitoring the call with the MT.

At 79, the new RNC (RNC-2) is informed by RNC-1 that the MT is being monitored. At 81, the RNC-2 instructs the new base station (BS-2) to monitor the subscriber, and includes the unique Call ID and the address of the Monitoring Station. Media then begins to flow from BS-2 to the Monitoring Station at 82. RNC-2 then informs Gatekeeper-2 at 83 that a new subscriber is now roaming in its service area, and that the new subscriber needs to be monitored. RNC-2 includes the IMSI for the MT, the unique Call ID, and the MT's new transport address in the message to Gatekeeper-2. Every time there is a change in the transport address of a monitored mobile terminal, the controlling Gatekeeper must inform the Monitoring Station of the new transport address. Thus, at 84, the new transport address and the Call ID are passed to the Monitoring Station.

The unique Call ID is used by the Monitoring Station to track all packets belonging to the same conversation. In addition, the Call ID is used by any Gatekeeper that handles a portion of the call (other than the original Gatekeeper) to report the same call to the Monitoring Station. Thus, during a handoff scenario, the RNC passes the Call ID to the same Gatekeeper if there is no change of domain, and to the new Gatekeeper when there is a change of domain.

At 85, Gatekeeper-2 sets a flag in the subscriber record for MT 71 indicating that the MT is in its area and is being monitored. The flag also indicates that a subscriber will soon have to register with his transport address. Since the MT changed its transport address, the MT is required to register with the new Gatekeeper and report its new transport address. A registration timer is started when the flag is set in case the registration never arrives (registration is lost, subscriber hangs up, etc.).

At 86, an ARQ message is sent from the MT to Gatekeeper-2. When the ARQ arrives, the registration timer in Gatekeeper-2 is stopped at 87, and bandwidth is allocated. Gatekeeper-2 then returns an ACF message 88 to the MT. Gatekeeper-2 knows that the MT is being monitored because Gatekeeper-2 was informed by RNC-2. Therefore, Gatekeeper-2 does not perform the monitoring procedure associated with the new registration. Thus, double monitoring of the conversation is avoided.

Whenever any monitored subscriber hangs up, a De-Admission Request is sent to the Gatekeeper. The Gatekeeper clears the flag for monitoring the subscriber and sends a message to the Monitoring Station to stop the monitoring of the call. This message is also propagated to the Access Router performing the monitoring.

It is thus believed that the operation and construction of the present invention will be apparent from the foregoing description. While the method shown and described has been characterized as being preferred, it will be readily apparent that various changes and modifications could be made therein without departing from the scope of the invention as defined in the following claims.

What is claimed is:

1. A method of monitoring a call with an Internet Protocol (IP) client in an IP-based network having a Gatekeeper that controls the network, a plurality of access routers that provide access to the network, and a Monitoring Station having monitoring facilities and a database of IP clients to be monitored, said method comprising:

receiving an access request from the IP client at the Gatekeeper;

sending a query from the Gatekeeper to the Monitoring Station asking whether the IP client is to be monitored;

receiving a reply sent from the Monitoring Station at the Gatekeeper indicating that the IP client is to be monitored and providing an IP address where monitored packets are to be sent; and sending a monitoring request from the Gatekeeper to an access router associated with the IP client, said request identifying the IP client to be monitored, instructing the access router to monitor the IP client, and providing the IP address where monitored packets are to be sent;

receiving an acknowledgment message from the access router at the Gatekeeper; and sending an admission confirm message from the Gatekeeper to the IP client when the acknowledgment message has been received from the access router.

2. The method of monitoring a call with an IP client in an IP-based network of claim 1 further comprising, before the step of sending a query from the Gatekeeper to the Monitoring Station asking whether the IP client is to be monitored, the step of performing bandwidth allocation functions by the Gatekeeper to determine whether network access can be granted to the IP client.

3. The method of monitoring a call with an IP client in, an IP-based network of claim 2 further comprising, after the step of receiving a reply from the Monitoring Station at the Gatekeeper indicating that the IP client is to be monitored, the step of setting a flag in the Gatekeeper identifying the IP client as a monitored, IP client.

4. The method of monitoring a call with an IP client in an IP-based network of claim 1, the method further comprising the steps of:

detecting by the access router, a packet associated with the IP client; and routing by the access router, all packets associated with the IP client to the Monitoring Station.

5. The method of monitoring a call with an IP client in an IP-based network of claim 4 wherein the step of detecting a packet associated with the IP client includes detecting a packet that has an address of the IP client as one address selected from the group of addresses consisting of a source address of the IP client and its a destination address of the IP client.

6. The method of monitoring a call with an IP client in an IP-based network of claim 3 further comprising the steps of:
sending a de-admission request from the IP client to the Gatekeeper;
clearing the flag in the Gatekeeper that identifies the IP client as a monitored IP client;
sending a message from the Gatekeeper to the Monitoring Station to stop the monitoring of the call; and
sending a message from the Gatekeeper to the access router to stop the routing of packets to the Monitoring Station.

7. The method of monitoring a call with an IP client in an IP-based network of claim 1 wherein the IP client is a mobile terminal (MT), and the method further comprises the steps of:
handing off the MT from a first base station to a second base station, each of said base stations being controlled by a single radio network controller (RNC);
sending a monitoring request from the RNC to the second base station, said request identifying the MT to be monitored, instructing the second base station to monitor the MT, and providing a unique call identification (Call ID) and the IP address where monitored packets are to be sent; and
sending a notification from the RNC to the Gatekeeper that the MT is being served by the second base station, said notification including the unique Call ID and a new transport address for the MT.

8. The method of monitoring a call with an IP client in an IP-based network of claim 7 further comprising sending the Call ID and the new transport address from the Gatekeeper to the Monitoring Station.

9. The method of monitoring a call with an IP client in an IP-based network of claim 1 wherein the IP client is a mobile terminal (MI), and the method further comprises the steps of:
handing off the MT from a first base station to a second base station, the first base station being controlled by a first radio network controller (RNC), and the second base station being controlled by a second RNC, and both RNCs being in a single Gatekeeper domain;
sending identifying information regarding the MT being monitored from the first RNC to the second RNC, said information including a unique call identification (Call ID);
sending a monitoring request from the second RNC to the second base station, said request identifying the MT to be monitored, instructing the second base station to monitor the MT, and providing the unique Call ID and the IP address where monitored packets are to be sent;
sending a notification from the second RNC to the Gatekeeper that the MT is being served by the second base station, said notification including the unique Call ID and a new transport address for the MT; and
sending the Call ID and the new transport address from the Gatekeeper to the Monitoring Station.

10. The method of monitoring a call with an IP client in an IP-based network of claim 4 wherein the step of detecting a packet associated with the IP client includes detecting a media having the IP client address as either a source address or destination address.

11. The method of monitoring a call with an IP client of claim 10 wherein the step of routing all packets associated with the IP client to the Monitoring Station includes encapsulating each packet associated with the IP client with a new header that includes the router's address as a source address, and the Monitoring Station's address as a destination address.

12. A method of handing off a monitored mobile terminal (MT) in an Internet Protocol (IP)-based network, said method comprising:
handing off the MT from a first base station to a second base station, the first base station being controlled by a first radio network controller (RNC) in a first Gatekeeper domain, and the second base station being controlled by a second RNC in a second Gatekeeper domain,
sending a notification from the first RNC to the second RNC that the MT is being monitored, said notification including a unique call identification (Call ID) and an IP address of a Monitoring Station where monitored packets are to be sent;
sending a monitoring request from the second RNC to the second base station, said request identifying the MT to be monitored, instructing the base station to monitor the MT, and providing the Call ID and the IP address of the Monitoring Station;
sending by the second base station, media packets having the MT address as a source address or destination address to the Monitoring Station;
sending the unique Call ID and a new transport address for the MT from the second RNC to the second Gatekeeper;
sending the unique Call ID and the new transport address for the MT from the second Gatekeeper to the Monitoring Station;
sending an access request from the MT to the second Gatekeeper; and
allocating bandwidth to the MT by the Gatekeeper.

13. The method of handing off a monitored MT in an IP-based network of claim 12 further comprising, after the step of sending a unique Call ID and a new transport address for the MT from the second RNC to the second Gatekeeper and to the Monitoring Station, the steps of:
setting a flag in the second Gatekeeper indicating that a monitored MT is in the second Gatekeeper's area, and that the MT will soon register with the second Gatekeeper; and
starting a registration timer in the second Gatekeeper.

14. The method of handing off a monitored MT in an IP-based network of claim 13 further comprising the steps of:
sending a de-admission request from the monitored MT to the second Gatekeeper, clearing the flag in the second Gatekeeper that identifies the MT as a monitored MT;
sending a message from the second Gatekeeper to the Monitoring Station to stop the monitoring of the call; and
sending a message from the second Gatekeeper to the second base station to stop the routing of packets to the Monitoring Station.

15. The method of handing off a monitored MT in an IP-based network of claim 12 further comprising, after the step of sending an access request from the MT to the second Gatekeeper, the step of stopping the registration timer.

16. The method of handing off a monitored MT in an IP-based network of claim 12 wherein the step of sending media packets having the MT address as a source address or destination address to the Monitoring Station includes encapsulating each packet associated with the MT with a new header that includes the second base station's address as a source address, and the Monitoring Station's address as a destination address.

17. A method of monitoring a call with a mobile terminal (MT) and routing the monitored call to a Monitoring Station having monitoring facilities and a database of MTs to be monitored, said method being performed within a Gatekeeper in an Internet Protocol (IP)-based network, and comprising the steps of:

receiving in the Gatekeeper, a network access request from the MT;

sending a query from the Gatekeeper to the Monitoring Station asking whether the MT is to be monitored;

receiving in the Gatekeeper, a reply from the Monitoring Station indicating that the MT is to be monitored and providing an IP address where monitored packets are to be sent; and sending a monitoring request from the Gatekeeper to an access router providing the MT with access to the network, said request identifying the MT to be monitored, instructing the access router to send any packets associated with the MT to the Monitoring Station, and providing a unique call identification (Call ID) and the IP address where monitored packets are to be sent.

18. A Gatekeeper acting to send a query to a Monitoring Station asking whether an IP client is to be monitored in response to a receipt of an access request from the IP client, wherein the Gatekeeper receives a reply from the Monitoring Station indicating that the IP client is to be monitored and providing an Up address where monitored packets are to be sent, the Gatekeeper further acting to send a monitoring request to an access router associated with the IP client, said request identifying the IP client to be monitored, instructing the access router to monitor the IP client, and providing the IP address where monitored packets are to be sent, the Gatekeeper further receives an acknowledgment message from the access router, sends an admission confirm message to the IP client when the acknowledgment message has been received from the access router.

19. The Gatekeeper of claim 18, wherein the Gatekeeper further performs bandwidth allocation functions to determine whether network access can be granted to the IP client.

20. The Gatekeeper of claim 19, wherein the Gatekeeper further sets a flag for identifying the IP client as a monitored IP client.

21. The Gatekeeper of claim 18, wherein the Gatekeeper further detects a packet that has the IP client as its source address.

22. The Gatekeeper of claim 18, wherein the Gatekeeper further detects a packet that has the IP client as its destination address.

23. The Gatekeeper of claim of claim 20, wherein the Gatekeeper further receives a de-admission request from the IP client, clears the flag that identifies the IP client as a monitored IP client, sends a message to the Monitoring Station to stop the monitoring of the call and sends a message to the access router to stop the routing of packets to the Monitoring Station.

24. The Gatekeeper of claim 18, wherein the Gatekeeper further sends a unique call identification (Call ID) and a new transport address to the Monitoring Station.

* * * * *

UNITED STATES PATENT AND TRADEMARK OFFICE
CERTIFICATE OF CORRECTION

PATENT NO. : 6,839,323 B1
APPLICATION NO. : 09/570997
DATED : January 4, 2005
INVENTOR(S) : Foti It is certified that error appears in the above-identified patent and that said Letters Patent is hereby corrected as shown below:

In Fig. 2, Sheet 2 of 6, for Tag "18", delete "MONITIRING" and insert -- MONITORING --, therefor.

In Column 1, Line 24, delete "EP" and insert -- IP --, therefor.

In Column 1, Line 37, after "enforcement" delete "L,".

In Column 1, Line 44, delete "THEE" and insert -- THE --, therefor.

In Column 3, Line 49, delete "(NM)" and insert -- (MT) --, therefor.

In Column 3, Line 59, after "network" delete "In".

In Column 4, Line 2, delete "circuit-switch" and insert -- circuit- --, therefor.

In Column 5, Line 4, delete "EP" and insert -- IP --, therefor.

In Column 6, Line 65, after "Call ID" delete "bu §".

In Column 7, Line 36, delete "18" and insert -- 78 --, therefor.

In Column 8, Line 39, in Claim 1, after "sent;" delete "and".

In Column 8, Line 62, in Claim 3, after "monitored" delete ",".

In Column 9, Line 8, in Claim 5, after "client and" delete "its".

In Column 9, Line 45, in Claim 9, delete "(MI)" and insert -- (MT) --, therefor.

In Column 10, Line 44, in Claim 12, after "the" insert -- second --.

In Column 10, Line 60, in Claim 14, delete "Gatekeeper," and insert -- Gatekeeper; --, therefor.

UNITED STATES PATENT AND TRADEMARK OFFICE
CERTIFICATE OF CORRECTION

PATENT NO.        : 6,839,323 B1
APPLICATION NO.   : 09/570997
DATED             : January 4, 2005
INVENTOR(S)       : Foti It is certified that error appears in the above-identified patent and that said Letters Patent is hereby corrected as shown below:

In Column 12, Line 4, in Claim 18, delete "Up" and insert -- IP --, therefor.

In Column 12, Line 26, in Claim 23, after "Gatekeeper" delete "of claim".

Signed and Sealed this

Fifteenth Day of April, 2008

JON W. DUDAS
*Director of the United States Patent and Trademark Office*

UNITED STATES PATENT AND TRADEMARK OFFICE
CERTIFICATE OF CORRECTION

PATENT NO. : 6,839,323 B1 Page 1 of 2
APPLICATION NO. : 09/570997
DATED : January 4, 2005
INVENTOR(S) : Foti It is certified that error appears in the above-identified patent and that said Letters Patent is hereby corrected as shown below:

In Fig. 2, Sheet 2 of 6, for Tag "18", delete "MONITIRING" and insert -- MONITORING --, therefor.

In Column 1, Line 24, delete "EP" and insert -- IP --, therefor.

In Column 1, Line 37, after "enforcement" delete "L,".

In Column 1, Line 44, delete "THEE" and insert -- THE --, therefor.

In Column 3, Line 49, delete "(NM)" and insert -- (MT) --, therefor.

In Column 3, Line 59, after "network" delete "In".

In Column 4, Line 2, delete "circuit-switch" and insert -- circuit- --, therefor.

In Column 5, Line 4, delete "EP" and insert -- IP --, therefor.

In Column 6, Line 65, after "Call ID" delete "bu §".

In Column 7, Line 36, delete "18" and insert -- 78 --, therefor.

In Column 8, Line 39, in Claim 1, after "sent;" delete "and".

In Column 8, Line 62, in Claim 3, after "monitored" delete ",".

In Column 9, Line 8, in Claim 5, after "client and" delete "its".

In Column 9, Line 45, in Claim 9, delete "(MI)" and insert -- (MT) --, therefor.

In Column 10, Line 44, in Claim 12, after "the" insert -- second --.

In Column 10, Line 60, in Claim 14, delete "Gatekeeper," and insert -- Gatekeeper; --, therefor.

UNITED STATES PATENT AND TRADEMARK OFFICE
CERTIFICATE OF CORRECTION

PATENT NO. : 6,839,323 B1
APPLICATION NO. : 09/570997
DATED : January 4, 2005
INVENTOR(S) : Foti It is certified that error appears in the above-identified patent and that said Letters Patent is hereby corrected as shown below:

In Column 12, Line 4, in Claim 18, delete "Up" and insert -- IP --, therefor.

In Column 12, Line 26, in Claim 23, after "Gatekeeper" delete "of claim".

Signed and Sealed this

Sixth Day of May, 2008

JON W. DUDAS
*Director of the United States Patent and Trademark Office*